US012662386B2

(12) United States Patent
Kamo et al.

(10) Patent No.: US 12,662,386 B2
(45) Date of Patent: Jun. 23, 2026

(54) HOLLOW SILICA PARTICLES AND METHOD FOR PRODUCING THE SAME

(71) Applicants: AGC Inc., Tokyo (JP); AGC SI-TECH CO., LTD., Kitakyushu (JP)

(72) Inventors: Hiromichi Kamo, Tokyo (JP); Masashi Kondo, Tokyo (JP); Hajime Katayama, Tokyo (JP)

(73) Assignees: AGC Inc., Tokyo (JP); AGC SI-TECH CO., LTD., Kitakyushu (JP)

( * ) Notice: Subject to any disclaimer, the term of this patent is extended or adjusted under 35 U.S.C. 154(b) by 696 days.

(21) Appl. No.: 17/892,359

(22) Filed: Aug. 22, 2022

(65) Prior Publication Data

US 2022/0396490 A1 Dec. 15, 2022

Related U.S. Application Data

(63) Continuation of application No. PCT/JP2021/006698, filed on Feb. 22, 2021.

(30) Foreign Application Priority Data

| | | |
|---|---|---|
| Feb. 27, 2020 | (JP) | 2020-032046 |
| Sep. 25, 2020 | (JP) | 2020-161378 |
| Sep. 25, 2020 | (JP) | 2020-161379 |

(51) Int. Cl.
*C01B 33/18* (2006.01)
*C09C 1/30* (2006.01)

(52) U.S. Cl.
CPC ............ *C01B 33/18* (2013.01); *C09C 1/3027* (2013.01); *C09C 1/3081* (2013.01); *C01P 2002/82* (2013.01); *C01P 2004/34* (2013.01);

*C01P 2004/61* (2013.01); *C01P 2004/64* (2013.01); *C01P 2006/10* (2013.01); *C01P 2006/12* (2013.01); *C01P 2006/14* (2013.01)

(58) Field of Classification Search
None
See application file for complete search history.

(56) References Cited

FOREIGN PATENT DOCUMENTS

| | | |
|---|---|---|
| CN | 103937241 A | 7/2014 |
| CN | 111232993 A | 6/2020 |
| EP | 2 455 428 A1 | 5/2012 |
| JP | 9-208215 | 8/1997 |
| JP | 2005-206436 | 8/2005 |
| JP | 2008-031409 A | 2/2008 |
| JP | 2009-203116 A | 9/2009 |
| JP | 2010-222147 A | 10/2010 |

(Continued)

OTHER PUBLICATIONS

Machine Translation of CN103937241 (Year: 2014).*

(Continued)

*Primary Examiner* — Michael Forrest
(74) *Attorney, Agent, or Firm* — Oblon, McClelland, Maier & Neustadt, L.L.P.

(57) ABSTRACT

The present invention relates to hollow silica particles, which each includes a shell layer containing silica and a space inside the shell layer, in which the hollow silica particles have a peak intensity derived from SiOH at a wavenumber of around 3,746 $cm^{-1}$ of 0.60 or less by infrared spectroscopy, a relative permittivity at 1 GHz of from 1.3 to 5.0 and a dielectric loss tangent at 1 GHz of from 0.0001 to 0.05.

12 Claims, 1 Drawing Sheet

(56)                    References Cited

FOREIGN PATENT DOCUMENTS

| | | |
|----|----|----|
| JP | 2010-260755 A | 11/2010 |
| JP | 2011-42527 | 3/2011 |
| JP | 2012-136363 A | 7/2012 |
| JP | 2013-173841 A | 9/2013 |
| JP | 2016-175797 | 10/2016 |
| WO | WO 2009/110514 | 9/2009 |
| WO | WO 2019/131658 | 7/2019 |
| WO | WO-2019/189020 A1 | 10/2019 |

OTHER PUBLICATIONS

Machine Translation of JP2012136363 (Year: 2012).*
Extended European Search Report issued Nov. 13, 2024, in corresponding European Patent Application No. 21759574.3 citing documents 24-26 therein, 9 pages.
DATABASE WPIWeek 200961 Thomson Scientific, London, GB; AN 2009-N37878-& JP 2009 203116 A (KAO CORP) Sep. 10, 2009, XP002811899, 2 pages.
DATABASE WPIWeek 201249 Thomson Scientific, London, GB; AN 2012-J37824-& JP 2012 136363 A (KAO CORP) Jul. 19, 2012, XP002811900, 2 pages.
DATABASE WPIWeek 201068 Thomson Scientific, London, GB; An 2010-M74221-& JP 2010 222147 A (KAO CORP) Oct. 7, 2010, XP00281190, 1 page.
International Search Report issued Apr. 27, 2021 in PCT/JP2021/006698 filed on Feb. 22, 2021, citing documents 18-20 therein, 3 pages.
P. Ruckdeschel et al., "Hollow silica sphere colloidal crystals: insights into calcination dependent thermal transport", Nanoscale, 2015, 7, 10059-10070.
Masayoshi Fujii et al., Advanced Materials with Novel Functions—Lecture 6, "Eco-Synthesis of Hollow Silica Nanoparticles and their Application", J. Jpn., Soc. Colour Mater., 91(6), 193-197 (2018) (with English abstract).
Ying Yuan et al., "Effects of perfluorooctyltriethoxysilane coupling agent on the properties of silica filled PTFE composites", J Mater Sci: Mater Electron (2017), 28:8810-8817.
Certificate of Experimental Results (1).
Certificate of Experimental Results (2).
Certificate of Experimental Results (3).
Certificate of Experimental Results (4).
Certificate of Experimental Results (5).
Certificate of Experimental Results (6).
Certificate of Experimental Results (7).
Certificate of Experimental Results (8).
Jelena Lasio et al., "Control of Mechanical Stability of Hollow Silica Particles, and Its Measurement by Mercury Intrusion Porosimetry", Langmuir 2017, vol. 33, p. 4666-4674.
Certificate of Experimental Results (1), Issue No. MKC-55460; Date issued: Oct. 24, 2025; Order No. 54300544 (English translation).
Certificate of Experimental Results (2), Quotation No. 3398; Sep. 10, 2025 (English translation).
Certificate of Experimental Results (3), Issue No. MKC-55611; Date issued: Oct. 22, 2025; Order No. 54300544 (English translation).
Certificate of Experimental Results (4), S431026; Nov. 19, 2025 (English translation).
Certificate of Experimental Results (5), S430744; Sep. 25, 2025 (English translation).
Certificate of Experimental Results (6), S430745; Sep. 16, 2025 (English translation).
Certificate of Experimental Results (7), Issue No. MKC-55616; Date issued: Oct. 23, 2025; Order No. 54300544 (English translation).
Certificate of Experimental Results (8); Order No. 8930958; Nov. 12, 2025 (English translation).

* cited by examiner

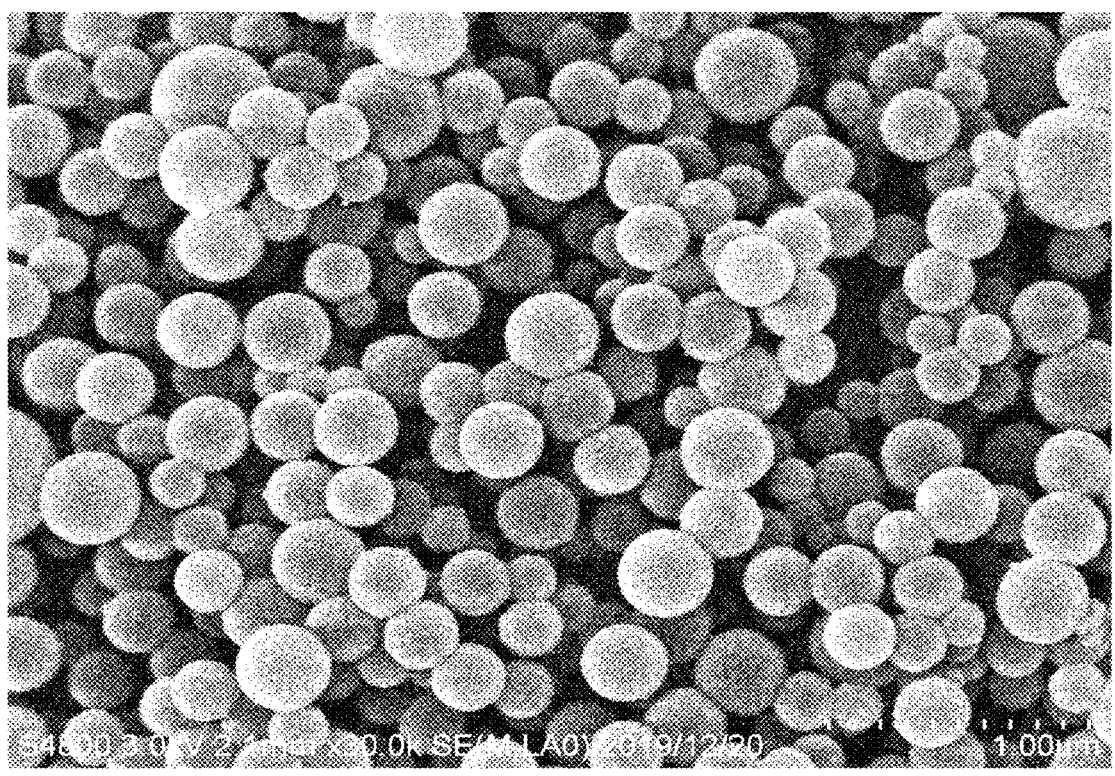

HOLLOW SILICA PARTICLES AND METHOD FOR PRODUCING THE SAME

CROSS-REFERENCE TO RELATED APPLICATIONS

This is a continuation of International Application No. PCT/JP2021/006698 filed on Feb. 22, 2021, and claims priority from Japanese Patent Application No. 2020-032046 filed on Feb. 27, 2020, Japanese Patent Application No. 2020-161378 filed on Sep. 25, 2020 and Japanese Patent Application No. 2020-161379 filed on Sep. 25, 2020, the entire content of which is incorporated herein by reference.

TECHNICAL FIELD

The present invention relates to hollow silica particles and a method for producing the same.

BACKGROUND ART

Nowadays, there are needs for size reductions in electronic appliances, an increase in the speed of signal transmission, and an increase in wiring density. For satisfying these requirements, resin compositions for use in insulating resin sheets, such as adhesive films and prepregs, and in insulating layers formed in printed wiring boards are required to be reduced in relative permittivity, dielectric loss tangent, and thermal expansion.

Use of hollow particles as a filler is being investigated in order to satisfy those requirements, and various proposals have been made. For example, Patent Document 1 describes a resin composition including (A) an epoxy resin, (B) a hardener, (C) hollow silica, and (D) fused silica. Patent Document 2 describes a low-dielectric resin composition including hollow particles and a thermosetting resin, in which 98 mass % or more of all shell of the hollow particles are formed of silica, and the hollow particles have an average porosity of from 30-80 vol % and an average particle size of from 0.1-20 μm.

Various proposals have been made also on hollow silica materials for use as a low-relative-permittivity material. For example, Patent Document 3 proposes a hollow silica material which has a closed-cavity structure including a porous shell and which has a cavity volume content of from 0-86%, a relative permittivity of from 1.5-3.3, a relative permittivity for flow in the 20-43.5 GHz frequency band of from 1.5-3.3, and a dielectric loss angle tangent of from 0.0005-0.004.

CITATION LIST

Patent Literature

Patent Document 1: JP-A-2013-173841
Patent Document 2: JP-A-2008-031409
Patent Document 3: Chinese Patent Application Publication No. 111,232,993

SUMMARY OF INVENTION

Technical Problem

However, there have been cases where conventional hollow silica particles, when added to a solvent, suffer solvent permeation into the particles and this makes the intended use of the particles impossible. For example, in the case where hollow silica particles are added to methyl ethyl ketone, the methyl ethyl ketone permeates into the particles to heighten the viscosity of the composition, making it impossible to increase the addition amount of the hollow silica particles and to attain a sufficient reduction in relative permittivity.

Meanwhile, regarding the hollow silica material described in Patent Document 3, hollow silica particles are obtained, in Examples of Patent Document 3, by coating an inorganic compound serving as a template with silica, removing the template, thereafter adding a silica sol, and maturing the mixture. This method, however, has a problem in that the inorganic compound as a template is prone to aggregate and it is impossible to control the aggregation of primary particles or the size of the aggregates.

An object of the present invention, which has been achieved in view of those problems, is to provide novel hollow silica particles which are sufficiently low in both relative permittivity and dielectric loss tangent and have excellent dispersibility.

Solution to Problem

The present invention related to the following (1) to (13).

(1) Hollow silica particles, which each include a shell layer containing silica and a space inside the shell layer, in which the hollow silica particles have a peak intensity derived from SiOH at a wavenumber of around 3,746 cm$^{-1}$ of 0.60 or less by infrared spectroscopy, a relative permittivity at 1 GHz of from 1.3 to 5.0 and a dielectric loss tangent at 1 GHz of from 0.0001 to 0.05.

(2) The hollow silica particles according to (1), which have a particle density as measured by a dry pycnometer density measurement using helium gas of from 2.00 g/cm$^3$ to 2.30 g/cm$^3$.

(3) The hollow silica particles according to (1) or (2), which have a particle density as measured by a dry pycnometer density measurement using argon gas of from 0.35 g/cm$^3$ to 2.00 g/cm$^3$.

(4) The hollow silica particles according to any one of (1) to (3), which have an average primary particle size of from 50 nm to 10 μm.

(5) The hollow silica particles according to any one of (1) to (4), which have a BET specific surface area of from 1 m$^2$/g to 300 m$^2$/g.

(6) The hollow silica particles according to any one of (1) to (5), which have a sphericity of from 0.75 to 1.0.

(7) The hollow silica particles according to any one of (1) to (6), which have an oil absorption of from 15 mL/100 g to 1,300 mL/100 g.

(8) The hollow silica particles according to any one of (1) to (7), which have a median diameter of secondary particles of from 0.20 μm to 60 μm.

(9) The hollow silica particles according to any one of (1) to (8), which have a coarse particle size (D90) of secondary particles of from 1 μm to 100 μm.

(10) The hollow silica particles according to any one of (1) to (9), which have a pore volume of 0.2 cm$^3$/g or less.

(11) The hollow silica particles according to any one of (1) to (10), in which a surface of the hollow silica particle is treated with a silane coupling agent.

(12) The hollow silica particles according to any one of (1) to (11), which contain one or more kinds of metal M selected from the group consisting of Li, Na, K, Rb, Cs, Mg, Ca, Sr, and Ba, in which a concentration of the metal M contained in the hollow silica particles is 50 mass ppm or more and 5 mass % or less.

(13) A method for producing hollow silica particles, the method including:

forming a shell layer containing silica on the periphery of each of cores to obtain a hollow silica precursor;

removing the cores from the hollow silica precursor;

heat-treating the resultant particles at a temperature of 800° C. or higher, and treating surfaces of the heat-treated particles with a silane coupling agent.

Advantageous Effects of Invention

The present invention can provide hollow silica particles which have dense shell layers and are sufficiently low in both relative permittivity and dielectric loss tangent. The hollow silica particles of the present invention are less apt to suffer the permeation of solvents such as methyl ethyl ketone and N-methylpyrrolidone thereinto and can hence exhibit a sufficiently low relative permittivity and a sufficiently low dielectric loss tangent even in resin compositions. Furthermore, the hollow silica particles have a moderate aggregate size and have excellent dispersibility in resins.

BRIEF DESCRIPTION OF DRAWINGS

The FIG. 1s a scanning electron microscope image (SEM image) of the hollow silica particles obtained in Ex. 1.

DESCRIPTION OF EMBODIMENTS

Now, the present invention will be described in detail. However, it should be understood that the present invention is by no means restricted to the following specific description.

(Hollow Silica Particles)

The hollow silica particles of the present invention each include a shell layer containing silica and have a space inside the shell layer. The fact that each hollow silica particle has a space inside the shell layer can be confirmed by an observation with a transmission electron microscope (TEM) or an observation with a scanning electron microscope (SEM). In the case of the SEM observation, the fact that the particle is hollow can be confirmed by observing a damaged particle which is partly open. A spherical particle having a space inside the particle confirmed by a TEM observation or an SEM observation is defined as "a primary particle". Since the primary hollow silica particles are partially bonded in the baking step or drying step, produced hollow silica particles, in many cases, are in the form of secondary particles having the primary particles aggregated.

In this description, a shell layer "containing silica" means that silica ($SiO_2$) is contained in the amount of 50 mass % or more. The composition of a shell layer can be measured by ICP emission spectrometry, flame atomic absorption method, etc. The silica contained in the shell layers is preferably 80 mass % or more, more preferably 95 mass % or more. The upper limit thereof is in theory 100 mass %. The silica contained in the shell layers is preferably less than 100 mass %, more preferably 99.99 mass % or less. Examples of the remainder include oxides and silicates of alkali metals, oxides and silicates of alkaline earth metals, and carbon.

The expression "including a space inside the shell layer" means a hollow state that a single space is surrounded by the shell layer when a cross section of a single primary particle is observed. That is, a single hollow particle has one large space and a shell layer surrounding the space.

The hollow silica particles of the present invention have a peak intensity derived from SiOH (silanol group) at a wavenumber of around 3,746 $cm^{-1}$ of 0.60 or less by infrared spectroscopy, a relative permittivity at 1 GHz of from 1.3 to 5.0 and a dielectric loss tangent at 1 GHz of from 0.0001 to 0.05. Since the hollow silica particles satisfy the relationship between the peak intensity derived from SiOH at a wavelength of around 3,746 $cm^{-1}$, determined by infrared spectroscopy, the relative permittivity and dielectric loss tangent, it is possible to provide a substrate having a low dielectric loss and sufficiently adoptable to high-frequency circuits.

The peak intensity derived from SiOH at a wavenumber of around 3,746 $cm^{-1}$, determined by infrared spectroscopy, is 0.60 or less. In the case where the peak intensity derived from SiOH is higher than 0.60, a dielectric-loss-tangent component derived from SiOH tends to be present in too large an amount and this results in an impaired dielectric loss tangent. The peak intensity derived from SiOH at a wavenumber of around 3,746 $cm^{-1}$ is preferably 0.40 or less, more preferably 0.30 or less, further preferably 0.20 or less, particularly preferably 0.10 or less. The lower the peak intensity derived from SiOH at a wavenumber of around 3,746 $cm^{-1}$, the more the dielectric loss tangent can be reduced. Consequently, the lower the lower limit thereof, the better. There is hence no particular lower limit thereof.

The word "around" has the following meaning. In the case of a wavenumber of around 3,746 $cm^{-1}$, this means the wavenumber range of from 3,732 $cm^{-1}$ to 3,760 $cm^{-1}$ in which the peak-center wavenumber is 3,746 $cm^{-1}$ and the width on each side of the peak center is 14 $cm^{-1}$ The same applies to other wavenumbers.

The peak intensity derived from SiOH at a wavenumber of around 3,746 $cm^{-1}$, determined by infrared spectroscopy, can be determined by a diffuse reflection method from an FT-IR spectrum by normalizing the absorption intensity of SiOH (at a wavenumber of around 3,746 $cm^{-1}$) with the peak intensity derived from any of various kinds of SiOH at a wavenumber of around 1,060 $cm^{-1}$, which is taken as 1.

The hollow silica particles of the present invention have a relative permittivity at 1 GHz of from 1.3 to 5.0. Especially in powder permittivity measurements, since the measurement accuracy is poor at frequencies of 10 GHz and higher because of too small sample spaces, in the present invention, values measured at 1 GHz are hence employed. In the case where the hollow silica particles have the relative permittivity at 1 GHz within that range, low relative permittivities required for electronic appliances can be attained. Incidentally, hollow silica particles having the relative permittivity at 1 GHz of less than 1.3 are substantially difficult to synthesize.

The lower limit of the relative permittivity at 1 GHz is preferably 1.4 or higher, more preferably 1.5 or higher. The upper limit thereof is preferably 4.5 or less, more preferably 4.0 or less, further preferably 3.5 or less, particularly preferably 3.0 or less, most preferably 2.5 or less.

The hollow silica particles of the present invention have a dielectric loss tangent at 1 GHz of from 0.0001 to 0.05. In the case where the hollow silica particles have the dielectric loss tangent at 1 GHz of 0.05 or less, low relative permittivities required for electronic appliances can be attained. Hollow silica particles having the dielectric loss tangent at 1 GHz of less than 0.0001 are substantially difficult to synthesize.

The lower limit of the dielectric loss tangent at 1 GHz is preferably 0.0005 or higher, more preferably 0.0006 or higher. The upper limit thereof is preferably 0.04 or less, more preferably 0.03 or less, further preferably 0.02 or less, still further preferably 0.01 or less, particularly preferably 0.005 or less, most preferably 0.003 or less.

The relative permittivity and the dielectric loss tangent can be measured by a perturbation resonator method using a device exclusively therefor (e.g., "Vector Network Analyzer E5063A", manufactured by KEYCOM Corporation.).

The hollow silica particles of the present invention preferably have a particle density, as determined by a density measurement with a dry pycnometer using helium gas (hereinafter referred to also as "helium pycnometer method"), of from 2.00 g/cm³ to 2.30 g/cm³.

From the density determined by the helium pycnometer method, it can be understood whether the shell layers of the hollow silica particles have pores or not. In the case where the hollow silica particles have a density determined by the helium pycnometer method of 2.00 g/cm³ or higher, this means that helium gas has permeated into the inside of the particles and remains in the inner spaces. This indicates that the shell layers have pores.

In the case where the density of the hollow silica particles determined by the helium pycnometer method is 2.00 g/cm³ or higher, the shell layers are dense silica layers and the hollow silica particles are less apt to break. In the case where the density thereof is 2.30 g/cm³ or less, the amorphous silica layers having low crystallinity are made to enable the hollow silica particles to have a reduced relative permittivity. The lower limit of the density of the hollow silica particles determined by the helium pycnometer method is more preferably 2.05 g/cm³ or higher, further preferably 2.07 g/cm³ or higher, particularly preferably 2.09 g/cm³ or higher, most preferably 2.10 g/cm³ or higher. The upper limit thereof is more preferably 2.25 g/cm³ or less.

The hollow silica particles of the present invention preferably have a density, as determined by a density measurement with a dry pycnometer using argon gas (hereinafter referred to also as "argon pycnometer method"), of from 0.35 g/cm³ to 2.00 g/cm³.

From the density determined by the argon pycnometer method, it can be understood whether the hollow silica particles are hollow or not. In the case where the shell layers are dense, argon gas, which has a larger molecular size than helium gas, cannot pass through the shell layers, and the apparent density of the particles is measured.

In the case where the density of the hollow silica particles determined by the argon pycnometer method is 2.00 g/cm³ or less, the apparent density is lower than the true density of silica (about 2.20 g/cm³) and it can hence be deemed that there are spaces inside the particles. Meanwhile, in the case where the density thereof is 0.35 g/cm³ or higher, the hollow silica particles can retain shell strength.

In addition, in the case where the density determined by the argon pycnometer method is lower than the density determined by the helium pycnometer method, minute gas molecules can go in and out of the inside of the hollow silica particles so that the inside of the particles has normal pressure. Particles having exceedingly dense shells, like glass balloons, have a pressure difference between the inside of the particles and the atmosphere and are hence prone to break when processed by stirring, kneading, etc. in producing a resin composition. In contrast, the hollow silica particles of the present invention have a small pressure difference between the inside of the particles and the atmosphere and are hence less apt to be broken by the processing.

From the standpoint of the strength of the shells of the particles, the lower limit of the density of the hollow silica particles determined by the argon pycnometer method is more preferably 0.40 g/cm³ or higher, most preferably 0.50 g/cm³ or higher. Meanwhile, from the standpoints of maintaining an air content and inhibiting the relative permittivity from increasing, the upper limit thereof is more preferably 1.70 g/cm³ or less, further preferably 1.60 g/cm³ or less, particularly preferably 1.50 g/cm³ or less, most preferably 1.40 g/cm³ or less.

The apparent density of the hollow silica particles can be determined also with a specific gravity bottle. A sample (hollow silica particles) and an organic solvent are put into the specific gravity bottle and allowed to leave to stand at 25° C. for 48 hours, and then a measurement is made. It is preferred to allow the contents to leave to stand for that period because there are cases where the permeation of the organic solvent requires much time depending on the denseness of the shells of the hollow silica particles. Results of the measurement made by this method correspond to the results of the density measurement with a dry pycnometer using argon gas.

The apparent density of the hollow silica particles of the present invention can be adjusted by adjusting the primary particle size and the thickness of the shells. Adjusting the density of the particles makes it possible to cause the particles to precipitate in a solvent, remain dispersed therein, or float at the top thereof. In the case where the particles are desired to be dispersed in a solvent, it is desirable that the density of the solvent is close to the apparent density of the particles. For example, in the case where the particles are desired to be dispersed in water having a density of 1.0 g/cm³, it is preferred to adjust the apparent density of the particles to from 0.8 g/cm³ or more to 1.2 g/cm³ or less.

The ratio, in a sample of hollow silica particles, of the number of complete hollow particles whose shell layers are not damaged and that have a space inside is referred to as the hollow particle ratio. Since the hollow silica particles of the present invention have dense shell layers, various solvents, argon and other gases having larger dynamic molecular sizes than argon gas are less apt to permeate into the particles. However, in the case where there are particles in which the shell layers have broken (damaged particles), the solvents and the gases permeate into these particles. Consequently, the apparent density changes depending on the hollow particle ratio. The higher the hollow particle ratio, the lower the apparent density of the hollow silica sample. The lower the hollow particle ratio, the higher the apparent density of the hollow silica sample. This tendency can be utilized to determine the hollow particle ratio from a theoretical density determined from the prepared amount of a raw material and an apparent density determined with a dry pycnometer, on the assumption that the yield is 100%.

The hollow particle ratio can be determined also from a weight change during a heat treatment in producing the hollow silica particles, using a cake which has been obtained through filtration and from which the oil cores have not been removed. The cake obtained through filtration is loosened and dried overnight. As a result, the oil component in the damaged particles is evaporated, while the oil component in the complete hollow particles remains therein. Since weight changes during the heat treatment in the case where all of the prepared oil component has evaporated (hollow particle ratio: 0%) and the case where all of the prepared oil component remains (hollow particle ratio: 100%) can be calculated from the prepared amounts of the raw materials, the hollow particle ratio can be determined from a weight change that occurs when the sample that has been dried overnight after filtration is heat-treated to 800° C.

The sizes of primary particles of the hollow silica particles are determined by observing directly the particle sizes (diameter) by SEM observation. Specifically, the sizes of the primary particles of 100 particles are measured from an SEM image thereof and a size distribution of primary particle obtained collecting them is estimated to be a size distribution of all the primary particle. By the SEM observation, the particle sizes of primary particles which are difficult to disaggregate can be directly measured.

The primary particle sizes are reflected in the surface state of the aggregated particles and are hence a parameter for determining specific surface area and oil absorption.

An average value of the sizes of the primary particles (average primary-particle size) is preferably in the range of from 50 nm to 10 μm. In the case where the average primary-particle size is less than 50 nm, the hollow silica particles are increased in specific surface area, oil absorption, and pore volume and the SiOH amount and adsorbed-water amount in the particle surface are increased. Hence, an increased dielectric loss tangent is prone to result. Meanwhile, in the case where the average primary-particle size is 10 μm or less, the hollow silica particles as a filler are easy to handle.

From the standpoint of reproducibility, the lower limit of the average primary-particle size is more preferably 70 nm or larger, most preferably 100 nm or larger, and the upper limit thereof is more preferably 5 μm or less, particularly preferably 3 μm or less.

The hollow silica particles preferably have a BET specific surface area of from 1 to 300 $m^2/g$. In the case where the BET specific surface area thereof is 1 $m^2/g$ or larger, adhesion to the resin can be ensured after the hollow silica particles have been used to produce a resin composition. In the case where the BET specific surface area thereof is 300 $m^2/g$ or less, the hollow silica particles can have a reduced oil absorption and a reduced adsorbed-water amount.

Since the denser the shells, the smaller the specific surface area, the BET specific surface area is more preferably 200 $m^2/g$ or less, further preferably 100 $m^2/g$ or less, particularly preferably 50 $m^2/g$ or less, most preferably 30 $m^2/g$ or less. The BET specific surface area is more preferably 2 $m^2/g$ or larger, most preferably 3 $m^2/g$ or larger.

The value of specific surface area is proportional to the primary particle size and the thickness of the shells of the hollow silica. When the radius of the primary particles is expressed by r and the thickness of the shells is expressed by d, then the value of BET specific surface area is preferably $3r^2/\{r^3-(r-d)^3\}\times2.2$ or larger.

The BET specific surface area can be determined using a surface area analyzer (e.g., "TriStar II 3020", manufactured by Shimadzu Corporation) by drying the hollow silica particles in a pretreatment at 230° C. until the pressure decreases to 50 mTorr and then examining the particles by a multipoint method using liquid nitrogen.

The hollow silica particles preferably have a sphericity of from 0.75 to 1.0. In case where the sphericity thereof is too low, the hollow silica particles are prone to break and there are cases where the hollow silica particles have an increased density as measured by the argon pycnometer method, an increased specific surface area, and an increased dielectric loss tangent.

A hundred particles arbitrarily selected from among projected photograph images obtained by photographing with a scanning electron microscope (SEM) are each examined to measure the longest diameter (DL) thereof and the shorter diameter (DS) orthogonal thereto, and then the ratio (DS/DL) of the shortest diameter (DS) to the longest diameter (DL) is calculated, and an average of calculated values of the ratio is taken as the sphericity.

From the standpoints of light-scattering properties, tactile, etc., the sphericity thereof is more preferably 0.80 or higher, further preferably 0.82 or higher, still further preferably 0.83 or higher, particularly preferably 0.85 or higher, especially preferably 0.87 or higher, most preferably 0.90 or higher.

The shell thickness of the hollow silica particles is preferably from 0.01 to 0.3 in terms of the ratio thereof to the diameter of the primary particle, which is taken as 1. In the case where the shell thickness in terms of the ratio thereof to the diameter of the primary particle, which is taken as 1, is smaller than 0.01, the hollow silica particles may have reduced strength. In the case where that ratio is larger than 0.3, the inner spaces are so small that the properties due to the hollow shape are not exhibited.

The shell thickness, in terms of the ratio thereof to the diameter of the primary particle, which is taken as 1, is more preferably 0.02 or larger, further preferably 0.03 or larger, and is more preferably 0.2 or less, further preferably 0.1 or less.

The shell thickness is determined by measuring the thickness of the shell of each particle with a transmission electron microscope (TEM).

Since the hollow silica particles each have a space inside, the particles can contain a substance enclosed therein. Since the hollow silica particles of the present invention have dense shell layers, various solvents are less apt to permeate thereinto. However, in the cases where the damaged particles exist, solvents enter into the inside of the damaged particles. Hence, the oil absorption changes depending on the proportion of damaged particles.

The oil absorption of the hollow silica particles is preferably from 15 mL/100 g to 1,300 mL/100 g. In the case where the oil absorption thereof is 15 mL/100 g or higher, adhesion to the resin can be ensured when the hollow silica particles are used to produce a resin composition. In the case where the oil absorption thereof is 1,300 mL/100 g or less, a resin composition obtained using the hollow silica particles can retain the strength of the resin and have a reduced viscosity.

Since too high oil absorption results in increased viscosity, the oil absorption of the hollow silica particles is more preferably 1,000 mL/100 g or less, further preferably 700 mL/100 g or less, particularly preferably 500 mL/100 g or less, most preferably 200 mL/100 g or less. Meanwhile, since too low oil absorption may result in impaired adhesion between the powder and resins, the oil absorption of the hollow silica particles is more preferably 20 mL/100 g or higher.

Since there is such relationship between the proportion of damaged particles and oil absorption, it is possible to adjust the oil absorption by adjusting the proportion of damaged particles. Furthermore, since the spaces among the primary particles are also spaces capable of holding oils, it is thought that the oil absorption is higher when the secondary particles, which are aggregates of primary particles, have a large median diameter, and is lower when the secondary particles have a small median diameter.

The median diameter of the secondary particles of the hollow silica particles is preferably from 0.20 μm to 60 μm.

In the case where the median diameter thereof is too small, there are cases where the hollow silica particles give a resin composition which has an increased viscosity or in which the hollow silica particles have impaired dispersibility. Consequently, the median diameter of the secondary particles is preferably 0.20 μm or larger, more preferably 0.25 μm or larger, further preferably 0.30 μm or larger. Meanwhile, too large median diameters are causative of graininess in films formed from the resin composition. Consequently, the median diameter of the secondary particles is preferably 60 μm or less, more preferably 50 μm or less, further preferably 30 μm or less, particularly preferably 20 μm or less, most preferably 10 μm or less.

The particle sizes (aggregate sizes of primary particles) of secondary particles are preferably measured by laser light scattering. The reason is that in aggregate size measurements with an SEM, the boundaries between the particles are so unclear that the dispersion in wet state is not reflected. Meanwhile, the reason is that in measurements with a Coulter counter, hollow particles are different from solid particles in electric-field change and it is difficult to obtain values corresponding to the solid particles.

The secondary particles of the hollow silica particles preferably have a coarse particle size (D90) of from 1 μm to 100 μm. In the case where particles having a small coarse particle size are produced, it is necessary to reduce the concentration of a silica source in the reaction liquid, and this results in a decrease in production efficiency. The coarse particle size is hence preferably 1 μm or larger from the standpoint of production efficiency. Meanwhile, since too large coarse particle sizes are causative of graininess in films formed from the resin composition, the coarse particle size of the secondary particles is preferably 100 μm or less. The lower limit of the coarse particle size thereof is more preferably 3 μm or larger, most preferably 5 μm or larger, and the upper limit thereof is more preferably 70 μm or less, further preferably 60 μm or less, particularly preferably 50 μm or less, most preferably 30 μm or less.

The coarse particle size is also determined by measuring the sizes of the secondary particles by laser light scattering as stated above.

The hollow silica particles preferably have a pore volume of 0.2 $cm^3/g$ or less. In the case where the pore volume thereof is higher than 0.2 $cm^3/g$, the hollow silica particles are prone to adsorb moisture and may give a resin composition having an impaired dielectric loss. The pore volume thereof is more preferably 0.15 $cm^3/g$ or less, further preferably 0.1 $cm^3/g$ or less, particularly preferably 0.05 $cm^3/g$ or less.

The surface of the hollow silica particles has preferably been treated with a silane coupling agent.

In the case where the surface of the hollow silica particles has been treated with a silane coupling agent, the particles have a reduced amount of remaining surface silanol groups and the surface thereof has been hydrophobized. Hence, not only the hollow silica particles are reduced in moisture adsorption and can have an improved dielectric loss but also the hollow silica particles, when used in producing a resin composition, show an improved affinity for the resin, resulting in improvements in dispersibility and in the strength of resin films formed therefrom.

Examples of the kinds of silane coupling agents include aminosilane-based coupling agents, epoxysilane-based coupling agents, mercaptosilane-based coupling agents, silane-based coupling agents, and organosilazane compounds. One silane coupling agent may be used alone, or two or more kinds of silane coupling agents may be used in combination.

The amount of the adhered silane coupling agent, per 100 parts by mass of the hollow silica particles, is preferably 1 part by mass or larger, more preferably 1.5 parts by mass or larger, further preferably 2 parts by mass or larger, and is preferably 10 parts by mass or less, more preferably 8 parts by mass or less, further preferably 5 parts by mass or less.

The fact that the surface of hollow silica particles has been treated with a silane coupling agent can be confirmed by detecting, by IR, a peak derived from a substituent of the silane coupling agent. The amount of the adhered silane coupling agent can be determined by carbon amount determination or thermogravimetry (TG).

The hollow silica particles preferably contain one or more kinds of metal M selected from the group consisting of Li, Na, K, Rb, Cs, Mg, Ca, Sr, and Ba. In the case where the hollow silica particles contain the metal M, the metal M acts as a flux during baking and the hollow silica particles can have a reduced specific surface area and a reduced dielectric loss tangent.

In producing the hollow silica particles, the metal M is contained during the period from a reaction step to a washing step. For example, hollow silica particles containing metal M can be obtained by adding a metal salt of the metal M to a reaction solution used in the reaction step for forming silica shells or by washing a hollow silica precursor with a solution containing a metal ion of the metal M before the hollow silica precursor is baked and densified.

The concentration of the metal M in the hollow silica particles is preferably 50 mass ppm or more to 5 mass % or less. In the case where the concentration of the metals M is 50 mass ppm or higher, the condensation of combined silanol groups can be accelerated by the fluxing effect during baking and a reduction in the amount of remaining silanol groups can be attained, resulting in a reduction in dielectric loss tangent. In the case where the concentration of the metal M is too high, the hollow silica particles contain a larger amount of a component which reacts with silica to form a silicate and hence may have enhanced hygroscopicity. Consequently, the metal M are contained preferably in an amount of 5 mass % or less. The concentration of the metal M is more preferably 100 mass ppm or higher, more preferably 150 mass ppm or higher, and is preferably 1 mass % or less, more preferably 5,000 mass ppm or less, most preferably 1,000 mass ppm or less.

The metal M can be determined by adding perchloric acid and hydrofluoric acid to the hollow silica particles, heating the mixture strongly to remove the silicon as a main component, and then analyzing the residue by ICP emission analysis.

In the case of using an alkali metal silicate as a silica material, the shell layers of the obtained hollow silica particles have a lower content of carbon (C) component derived from the raw material than in the case of using a silicon alkoxide as a silica material.

(Method for Producing the Hollow Silica Particles)

Examples of methods for producing the hollow silica particles of the present invention include a method in which an oil-in-water emulsion including an aqueous phase, an oil phase, and a surfactant is used, a hollow silica precursor is obtained in the emulsion, and hollow silica particles are obtained from the precursor. The oil-in-water emulsion is an emulsion having oil phase dispersed in water. Upon addition of a silica material to the emulsion, the silica material is deposited on the oil droplets. Thus, oil core/silica shell particles can be formed.

The method for producing the hollow silica particles of the present invention includes forming a shell layer containing silica on the periphery of each of the cores to obtain a hollow silica precursor, removing the cores from the hollow silica precursor, heat-treating the resultant particles at 800° C. or higher, and treating the surface of the heat-treated particles with a silane coupling agent. The hollow silica precursor is preferably obtained by adding a first silica material to the oil-in-water emulsion, which includes an aqueous phase, an oil phase, and a surfactant, to form first-stage shells and adding a second silica material to the emulsion in which the first-stage shells have been formed, thereby forming second-stage shells.

Hereinafter, the oil-in-water emulsion is sometimes referred to simply as an emulsion. Further, the dispersion having oil core/silica shell particles dispersed, formed by the addition of the first silica material and not having the second silica material added, and dispersion oil core/silica shell particles dispersed and having the second silica material added may also be sometimes referred to as an emulsion. The latter dispersion having oil core/silica shell particles dispersed and having the second silica material added, may be the same as a hollow silica precursor dispersion.

<Formation of First-Stage Shells>

First, a first silica material is added to an oil-in-water emulsion including an aqueous phase, an oil phase, and a surfactant, thereby forming first-stage shells.

The aqueous phase of the emulsion mainly includes water as a solvent. The aqueous phase may further contain additives such as a water-soluble organic liquid and a water-soluble resin. The proportion of the water in the aqueous phase is preferably from 50 to 100 mass %, more preferably from 90 to 100 mass %.

The oil phase of the emulsion preferably includes a water-insoluble organic liquid which is incompatible with the aqueous phase component. This organic liquid forms droplets in the emulsion to thereby form an oil core portion of the hollow silica precursor.

Examples of the organic liquid include:

aliphatic hydrocarbons such as n-hexane, isohexane, n-heptane, isoheptane, n-octane, isooctane, n-nonane, isononane, n-pentane, isopentane, n-decane, isodecane, n-dodecane, isododecane, and pentadecane and paraffin base oil which is mixture thereof; alicyclic hydrocarbons such as cyclopentane, cyclohexane, and cyclohexene and naphthenic base oil which is mixtures thereof; aromatic hydrocarbons such as benzene, toluene, xylene, ethylbenzene, propylbenzene, cumene, mesitylene, tetralin, and styrene; ethers such as propyl ether and isopropyl ether; esters such as ethyl acetate, n-propyl acetate, isopropyl acetate, n-butyl acetate, isobutyl acetate, n-amyl acetate, isoamyl acetate, butyl lactate, methyl propionate, ethyl propionate, butyl propionate, methyl butyrate, ethyl butyrate, and butyl butyrate; vegetable oils such as palm oil, soybean oil, and rapeseed oil; and fluorinated solvents such as hydrofluorocarbon, perfluorocarbon, and perfluoropolyether. Also usable is a polyoxyalkylene glycol which is a hydrophobic liquid at a temperature for shell forming reaction. Examples thereof include polypropylene glycol (molecular weight: at least 1,000) and a polyoxyethylene/polyoxypropylene block copolymer having a proportion of oxyethylene units of less than 20 mass % and a cloudy point (1 mass % aqueous solution) of 40° C. or lower, preferably 20° C. or lower. Among them, a polyoxypropylene/polyoxyethylene/polyoxypropylene type block copolymer is preferably used.

One of these may be used alone, or two or more thereof may be used in combination so long as a single oil phase is formed.

The organic liquid is preferably $C_{8-16}$, particularly $C_{9-12}$, hydrocarbon. The organic liquid is selected while comprehensively considering the workability, the safety against fire, separation property between the hollow silica precursor and the organic liquid, the shape characteristic of the hollow silica particles, solubility of the organic liquid in water, etc. The $C_{8-16}$ hydrocarbon may be any of linear, branched, and cyclic hydrocarbons so long as it is chemically stable, or may be a mixture of hydrocarbons differing in the number of carbon atoms. The hydrocarbon is preferably a saturated hydrocarbon, more preferably a linear saturated hydrocarbon.

The organic liquid is preferably one having a flash point of 20° C. or higher, more preferably 40° C. or higher. In the case where an organic liquid having a flash point of lower than 20° C. is used, counter measures in the work environment are required for fire prevention because of the too low flash point.

The emulsion contains a surfactant for enhancing emulsification stability. The surfactant is preferably water-soluble or water-dispersible, and it is preferred to add the surfactant to the aqueous phase. The surfactant is preferably a nonionic surfactant.

Examples of the nonionic surfactant include the following surfactants.

Polyoxyethylene/polyoxypropylene copolymer type surfactants;

polyoxyethylene sorbitan fatty acid ester type surfactants: polyoxyethylene sorbitan monolaurate, polyoxyethylene sorbitan monopalmitate, polyoxyethylene sorbitan monostearate, polyoxyethylene sorbitan tristearate, and polyoxyethylene sorbitan monooleate;

polyoxyethylene higher alcohol ether type surfactants: polyoxyethylene lauryl ether, polyoxyethylene cetyl ether, polyoxyethylene stearyl ether, polyoxyethylene oleyl ether, polyoxyethylene octyl phenol ether, and polyoxyethylene nonylphenol ether;

polyoxyethylene aliphatic ester type surfactants: polyoxyethylene glycol monolaurate, polyoxyethylene glycol monostearate, and polyoxyethylene glycol monooleate; and glycerin fatty acid ester type surfactants: monoglyceryl stearate and monoglyceryl oleate.

Also usable are a polyoxyethylene sorbitol fatty acid ester type surfactant, a sucrose fatty acid ester type surfactant, a polyglycerin fatty acid ester type surfactant, a polyoxyethylene hydrogenated castor oil type surfactant, etc.

One of these may be used alone, or two or more kinds thereof may be used in combination.

Among the above-mentioned nonionic surfactants, the polyoxyethylene/polyoxypropylene copolymer type surfactants are preferably used. The polyoxyethylene/polyoxypropylene copolymer is a block copolymer including a polyoxyethylene block (EO) and a polyoxypropylene block (PO) bonded thereto. Examples of the block copolymer include an EO-PO-EO block copolymer and an EO-PO block copolymer, and the EO-PO-EO block copolymer is preferred. The proportion of oxyethylene units in the EO-PO-EO block copolymer is preferably 20 mass % or more, more preferably 30 mass % or more.

The weight average molecular weight of the polyoxyethylene/polyoxypropylene copolymer is preferably from 3,000 to 27,000, more preferably from 6,000 to 19,000.

To the entire polyoxyethylene/polyoxypropylene copolymer, the total amount of the polyoxyethylene block is preferably from 40 mass % to 90 mass % and the total amount of the polyoxypropylene block is preferably from 10 mass % to 60 mass %.

The amount of the surfactant to be used varies depending upon conditions such as the type of the surfactant, the HLB (Hydrophile-lipophile balance) of the surfactant, which is an index indicating the degree of hydrophilicity or hydrophobicity of the surfactant, and the particle size of the silica particles desired. However, the content thereof in the aqueous phase is preferably from 500 mass ppm to 20,000 mass ppm, more preferably from 1,000 mass ppm to 10,000 mass ppm. In the case where it is 500 mass ppm or more, the emulsion can be more stabilized. Furthermore, in the case where it is 20,000 mass ppm or less, hollow silica particles having a reduced residual-surfactant content can be obtained.

The aqueous phase and the oil phase may be mixed in a mass ratio of from 200:1 to 5:1, preferably from 100:1 to 9:1.

Methods for preparing the oil-in-water emulsion are not limited to the following ones. The aqueous phase and the oil phase are preliminary prepared, and the oil phase is added to the aqueous phase, followed by sufficient mixing or stirring, thereby preparing the oil-in-water emulsion. Methods such as ultrasonic emulsification for physically applying a strong shearing force, emulsification by stirring, high-pressure emulsification, or the like may be employed. Further, membrane emulsification of forcing the oil phase through a membrane having fine pores to form fine droplets of the oil phase, which are dispersed in the aqueous phase, a phase inversion emulsification method of dissolving the surfactant in the oil phase and then adding the aqueous phase and conducting emulsification, or a phase inversion temperature emulsification method of utilizing a phenomenon that the surfactant changes from water-soluble to oil-soluble at a temperature around a cloudy point may, for example, be mentioned. The emulsification method may be appropriately selected depending upon properties such as the desired particle size, particle size distribution, etc.

For obtaining hollow silica particles having a reduced particle size and a narrowed particle size distribution, it is preferred that the oil phase is sufficiently dispersed and emulsified in the aqueous phase. For example, the mixed liquid can be emulsified using a high-pressure homogenizer at a pressure of 100 bar or more, preferably 400 bar or more.

In the step of forming first-stage shells, a first silica material is added to the oil-in-water emulsion.

Examples of the first silica material include: an aqueous solution in which water-soluble silica is dissolved; an aqueous dispersion in which solid silica is dispersed; a mixture thereof; and one or more kinds selected from the group consisting of an alkali metal silicate, activated silicic acid, and a silicon alkoxide or an aqueous solution thereof or aqueous dispersion thereof. Among these examples, one or more kinds selected from the group consisting of an alkali metal silicate, activated silicic acid, and a silicon alkoxide or an aqueous solution thereof or aqueous dispersion thereof are preferable in view of availability.

Examples of the solid silica include silica sol obtained by hydrolyzing an organic silicon compound and commercially available silica sol.

Examples of the alkali metals of the alkali metal silicates include lithium, sodium, potassium, and rubidium, and sodium is preferred of these from the standpoints of availability and the cost. That is, sodium silicate is a preferred example of alkali metal silicates. Sodium silicate has a composition represented by $Na_2OnSiO_2 \cdot mH_2O$. The proportion of sodium to silicate, in terms of $SiO_2/Na_2O$·molar ratio n, is preferably from 1.0 to 4.0, more preferably from 2.0 to 3.5.

The activated silicic acid is one obtained by subjecting an alkali metal silicate to a cation exchange treatment to replace the alkali metal with hydrogen, and aqueous solutions of the activated silicic acid are weakly acidic. For the cation exchange treatment, a hydrogen type cation exchange resin can be used.

The alkali metal silicate and the activated silicic acid are preferably dissolved or dispersed in water before being added to the emulsion. The concentration of the alkali metal silicate aqueous solution or activated silicic acid aqueous solution, in terms of $SiO_2$ concentration, is preferably from 3 mass % to 30 mass %, more preferably from 5 mass % to 25 mass %.

Preferred for use as the silicon alkoxide is, for example, a tetraalkylsilane such as tetramethoxysilane, tetraethoxysilane, or tetrapropoxysilane.

It is possible to obtain composite particles by mixing other metal oxide or the like together with the silica material. Examples of the other metal oxide include titanium dioxide, zinc oxide, cerium oxide, copper oxide, iron oxide, and tin oxide.

Only one of those silica materials or a mixture of two or more thereof can be used as the first silica material. It is preferred to use an alkali metal silicate aqueous solution among those, particularly a sodium silicate aqueous solution, as the first silica material.

The addition of the first silica material to the oil-in-water emulsion is preferably conducted under acidic conditions. By adding the silica material under an acidic environment, fine silica particles are formed to constitute a network, thereby forming a first-stage coating film. The reaction temperature is preferably 80° C. or lower from the standpoint of maintaining emulsion stability, and is more preferably 70° C. or lower, further preferably 60° C. or lower, particularly preferably 50° C. or lower, most preferably 40° C. or lower. Meanwhile, from the standpoint of controlling the rate of forming a network of fine silica particles in order to form a coating film having a uniform thickness, the reaction temperature is preferably 4° C. or higher, more preferably 10° C. or higher, further preferably 15° C. or higher, particularly preferably 20° C. or higher, most preferably 25° C. or higher.

The pH of the oil-in-water emulsion is regulated to preferably less than 3, more preferably 2.4 or less, and is more preferably 1 or higher, from the standpoints of making the thickness of the coating film more uniform and obtaining hollow silica having denser silica shell layers.

Examples of methods for regulating the pH of the oil-in-water emulsion to a value in an acidic range include to add an acid.

Examples of the acid include hydrochloric acid, nitric acid, sulfuric acid, acetic acid, perchloric acid, hydrobromic acid, trichloroacetic acid, dichloroacetic acid, methanesulfonic acid, and benzenesulfonic acid.

In the addition of the first silica material, the amount of the first silica material to be added is such that the amount of the $SiO_2$ in the first silica material is preferably from 1 part by mass to 50 parts by mass, more preferably from 3 parts by mass to 30 parts by mass, with respect to 100 parts by mass of the oil phase contained in the emulsion.

In the addition of the first silica material, after the addition of the first silica material, the emulsion in the state of having a pH kept in an acidic range is held for preferably 1 minute or longer, more preferably 5 minutes or longer, further preferably 10 minutes or longer.

Then, it is preferable that the pH of the emulsion having the first silica material added is kept at 3 or more to 7 or less (from weakly acidic to neutral). Thus, the first silica material can be fixed to the surface of the oil droplets.

For example, there is a method for regulating the pH of emulsion to 3 or higher by adding a base to the emulsion having the first silica material added.

Examples of the base include alkali metal hydroxides such as sodium hydroxide and potassium hydroxide, alkaline earth metals hydroxides such as magnesium hydroxide and calcium hydroxide, ammonia, and amines.

Alternatively, use may be made of a method in which anions such as halogen ions are replaced with hydroxide ions by an anion-exchange treatment.

The addition of a base is preferably conducted in such a manner that while the emulsion having the first silica material added is kept being stirred, the base is gradually added thereto to gradually increase the pH of the emulsion. In the case where the stirring is too weak or in the case where the base is added in a large amount at a time, the pH of the emulsion may become ununiform and this may result in making the thickness of a first layer coating film ununiform.

It is preferred that the emulsion is held while being stirred. The holding time may be 10 minutes or longer, preferably 1 hour or longer, and may be 4 hours or longer. The holding temperature is preferably 100° C. or lower from the standpoint of maintaining the stability of the emulsion, and is more preferably 95° C. or lower, further preferably 90° C. or lower, particularly preferably 85° C. or lower. From the standpoint of accelerating maturation, the holding temperature is preferably 35° C. or higher, more preferably 40° C. or higher, particularly preferably 45° C. or higher.

<Formation of Second-Stage Shells>

Next, a second silica material is added to the emulsion in the presence of alkali metal ions. As a result, a hollow silica precursor dispersion is obtained. The hollow silica precursor is oil core/silica shell particles.

The addition of the second silica material to the emulsion is preferably conducted under alkaline conditions.

For the addition of the first silica material, a method is used in which the emulsion was temporarily made acidic and then made to have a pH of 3 or more to 7 or less (from weakly acidic to neutral), in order to more uniformly deposit the first silica material on the oil droplets. The first silica layer obtained by this method is porous and insufficiently dense and hence undesirably has reduced strength. By alkalifying the emulsion in the addition of the second silica material, a highly dense, second silica layer can be formed on the obtained first silica layer.

The pH of the emulsion at the time of addition of the second silica material is preferably 8 or higher, more preferably 8.5 or higher, further preferably 8.7 or higher, particularly preferably 8.9 or higher, most preferably 9 or higher, from the standpoint of inhibiting the formation of new fine particles. Meanwhile, since too high pH values heighten the solubility of the silica, the pH of the emulsion is preferably 13 or less, more preferably 12.5 or less, further preferably 12 or less, particularly preferably 11.5 or less, most preferably 11 or less.

Examples of methods for regulating the pH of the oil-in-water emulsion to a value in an alkaline range include to add a base. As the base, use may be made of the same compounds as mentioned above.

As the second silica material, use can be made of either any one of the same silica materials shown above as the first silica material or a mixture of two or more kinds thereof. Among these, at least one of a sodium silicate aqueous solution and an activated silicic acid aqueous solution is preferred as the second silica material.

For adding the second silica material to the emulsion under alkaline conditions, use may be made of a method in which an alkali metal hydroxide is added simultaneously with the second silica material. Use may also be made of a method in which sodium silicate is used as an alkali metal silicate as the second silica material. In this case, since sodium silicate component, which is an alkali component, is added to the emulsion that has been made weakly acidic to have a pH of 5 or higher after the addition of the first silica material, the pH of the emulsion can be kept in an alkaline range while the second silica material is being added. In addition, alkali metal ions become present in the emulsion.

In the case where the pH becomes too high as in the case of using a sodium silicate aqueous solution as the second silica material, an acid may be added in order to adjust the pH. As this acid, use may be made of the same acid as that used to add the first silica material.

The addition of the second silica material is preferably conducted in the presence of alkali metal ions. The alkali metal ions may be ones derived from the first silica material, ones derived from the second silica material, or ones derived from a base added for pH regulation, and it is also possible to incorporate alkali metal ions, for example, by adding an additive to the emulsion. An example thereof is the case in which an alkali metal silicate is used as at least one of the first silica material and the second silica material. Another example is the case where a halide, sulfate, nitrate, fatty acid salt, or another compound of an alkali metal is added as an additive to the emulsion.

As the second silica material, either a sodium silicate aqueous solution or an activated silicic acid aqueous solution may, for example, be added or both may be added, to the emulsion having the first silica material added. In the case of adding both, the sodium silicate aqueous solution and the activated silicic acid aqueous solution may be added all at once or in order.

The addition of the second silica material may be carried out, for example, by conducting a step of adding the sodium silicate aqueous solution and a step of adding the activated silicic acid aqueous solution, once or repeatedly two or more times, so as to promote deposition of the silica material on the first silica layer while the pH is adjusted.

It is preferred to add the second silica material to the emulsion which has been heated so as to promote the deposition of the silica material on the first silica layer. The heating temperature is preferably 30° C. or higher, more preferably 35° C. or higher, further preferably 40° C. or higher, particularly preferably 45° C. or higher, most preferably 50° C. or higher, from the standpoint of inhibiting the formation of new fine particles. Since too high temperatures enhance the solubility of the silica, the heating temperature is preferably 100° C. or lower, more preferably 95° C. or lower, further preferably 90° C. or lower, particularly preferably 85° C. or lower, most preferably 80° C. or lower. In the case where the heated emulsion was used, the emulsion yielded after the addition of the second silica material is preferably gradually cooled to room temperature (about 23° C.).

In the addition of the second silica material, the amount of the second silica material to be added is regulated so that the amount of the $SiO_2$ in the second silica material is preferably from 20 parts by mass to 500 parts by mass, more preferably from 40 parts by mass to 300 parts by mass, with respect to 100 parts by mass of the oil phase.

In the addition of the second silica material, after the addition of the second silica material, the emulsion, in the state of having a pH kept in an alkaline range, is preferably held for 10 minutes or longer.

The addition of the first silica material and the addition of the second silica material are preferably conducted so that the total amount of the first silica material and second silica material to be added is regulated so that the total of the $SiO_2$ in the first silica material and the SiO$_2$ in the second silica material is preferably from 30 parts by mass to 500 parts by mass, more preferably from 50 parts by mass to 300 parts by mass, with respect to 100 parts by mass of the oil phase.

The silica shell layer of the present invention mainly contains silica, but other metal component such as Ti or Zr may be contained for the purpose of regulating refractive index, etc., according to need. Methods for containing other metal component are not particularly limited, and use may be made, for example, of a method in which a metal sol liquid or a metal salt aqueous solution is added simultaneously in the step of adding a silica material.

In the manner described above, a hollow silica precursor dispersion is obtained.

Examples of methods for obtaining the hollow silica precursor from the hollow silica precursor dispersion include a method in which the dispersion is filtered, a method in which the dispersion is heated to remove the aqueous phase, and a method in which the precursor is separated by sedimentation separation or centrifugal separation.

An example is a method in which the dispersion is filtered through a filter of about from 0.1 μm to 5 μm and drying the hollow silica precursor obtained by filtering.

The obtained hollow silica precursor may be washed with water, an acid, an alkali, an organic solvent, etc. according to need.

<Heat Treatment of the Hollow Silica Precursor>

Subsequently, the oil cores are removed from the hollow silica precursor and a heat treatment is conducted. Examples of methods for removing the oil cores include: a method in which the hollow silica precursor is baked to burn and decompose the oil; a method in which the precursor is dried to volatilize the oil; a method in which an appropriate additive is added to decompose the oil; and a method in which an organic solvent or the like is used to extract the oil. Preferred of these is the method in which the hollow silica precursor having low oil residue content is heat-treated.

In the method in which the hollow silica precursor is baked to remove the oil cores, it is preferred to conduct a heat treatment in at least two stages at different temperatures. A second-stage baking temperature is preferably higher than a first-stage heat treatment temperature. After the first-stage baking and before conducting the second-stage heat treatment, the hollow silica precursor may be returned to room temperature or the hollow silica precursor in the state of having the first-stage baking temperature may be heated to the second-stage heat treatment temperature.

In the first-stage heat treatment, the organic components, which are the oil cores and the surfactant, are removed. Since it is necessary to thermally decompose the oil cores within the hollow particles, the temperature is preferably 100° C. or higher, more preferably 200° C. or higher, most preferably 300° C. or higher. In the case where the first-stage heat treatment is conducted at too high a temperature, the densification of the silica shells proceeds and this makes the removal of the inside organic components difficult. Consequently, the temperature is desirably lower than 800° C., preferably 550° C. or lower, more preferably 530° C. or lower, further preferably 520° C. or lower, particularly preferably 510° C. or lower, most preferably 500° C. or lower.

Subsequently, in the second-stage heat treatment, the hollow silica particles are baked and densified, thereby densifying the shells and diminishing the surface silanol groups to reduce the dielectric loss tangent. Since it is preferred to conduct the second-stage heat treatment at a temperature higher than in the first-stage heat treatment, the temperature thereof is preferably 800° C. or higher, more preferably 900° C. or higher, most preferably 1,000° C. or higher. Meanwhile, since too high temperatures are causative of crystallization of the amorphous silica to heighten the relative permittivity, the second-stage heat-treatment temperature is preferably 1,200° C. or lower, more preferably 1,150° C. or lower, most preferably 1,100° C. or lower. The second-stage heat-treatment temperature is higher than the first-stage heat-treatment temperature preferably by at least 200° C., more preferably by from 200° C. to 800° C., further preferably by from 400° C. to 700° C.

<Surface Treatment of the Hollow Silica Baked Particles>

Thereafter, the surface of the hollow silica baked particles obtained in the step described above is treated with a silane coupling agent. In this step, silanol groups existed on the surface of the hollow silica baked particles are reacted with the silane coupling agent. Thus, the surface silanol groups can be diminished to attain a reduction in dielectric loss tangent. Furthermore, the surface is hydrophobized to improve the affinity for resins. The treated particles hence have improved dispersibility in resins.

There are no particular limitations on conditions for the surface treatment, and a wet treatment method or a dry treatment method may be used under common surface-treatment conditions. From the standpoint of performing a uniform treatment, a wet treatment method is preferred.

Examples of the silane coupling agent for use in the surface treatment include aminosilane-based coupling agents, epoxysilane-based coupling agents, mercaptosilane-based coupling agents, silane-based coupling agents, and organosilazane compounds. One of these may be used alone, or two or more kinds thereof may be used in combination.

Specific examples of the surface treatment agent include: aminosilane-based coupling agents such as aminopropylmethoxysilane, aminopropyltriethoxysilane, ureidopropyltriethoxysilane, N-phenyl aminopropyltrimethoxysilane, and N-2(aminoethyl)aminopropyltrimethoxysilane; epoxysilane-based coupling agents such as glycidoxypropyltrimethoxysilane, glycidoxypropyltriethoxysilane, glycidoxypropylmethyldiethoxysilane, glycidylbutyltrimethoxysilane, and (3,4-epoxycyclohexyl) ethyltrimethoxysilane; mercaptosilane-based coupling agents such as mercaptopropyltrimethoxysilane and mercaptopropyltriethoxysilane; silane-based coupling agents such as methyltrimethoxysilane, vinyltrimethoxysilane, octadecyltrimethoxysilane, phenyltrimethoxysilane, (methacryloyloxy)propyltrimethoxysilane, imidazole silane, and triazine silane; fluorine-containing silane coupling agents such as $CF_3(CF_2)_7CH_2CH_2Si(OCH_3)_3$, $CF_3(CF_2)_7CH_2CH_2SiCl_3$, $CF_3(CF_2)_7CH_2CH_2Si(CH_3)(OCH_3)_2$, $CF_3(CF_2)_7$ $CH_2CH_2Si(CH_3)C_{12}$, $CF_3(CF_2)_5CH_2CH_2SiC_{13}$, $CF_3$ $(CF_2)_5CH_2CH_2Si(OCH_3)_3$, $CF_3CH_2CH_2SiCl_3$, $CF_3CH_2CH_2Si(OCH_3)_3$, $C_8F_{17}SO_2N(C_3H_7)$ $CH_2CH_2CH_2Si(OCH_3)_3$, $C_7F_{15}CONHCH_2CH_2CH_2Si$ $(OCH_3)_3$, $C_8F_{17}CO_2CH_2CH_2CH_2S(OCH_3)_3$, $C_8F_{17}—$ $O—CF(CF_3)CF_2—O—C_3H_6SiCl_3$, and $C_3F_7—O—(CF(CF_3)CF_2—O)_2—CF(CF_3)CONH—$ $(CH_2)_3Si(OCH_3)_3$; and organosilazane compounds such as hexamethyldisilazane, hexaphenyldisilazane, trisilazane, cyclotrisilazane, and 1,1,3,3,5,5-hexamethylcyclotrisilazane.

The amount in which the silane coupling agent is to be used for the treatment, with respect to 100 parts by mass of the hollow silica particles, is preferably 1 part by mass or larger, more preferably 2 parts by mass or larger, and is preferably 10 parts by mass or less, more preferably 8 parts by mass or less, further preferably 5 parts by mass or less.

Examples of methods for the treatment with the silane coupling agent include a dry method in which the silane coupling agent is sprayed over the hollow silica baked particles and a wet method in which the hollow silica baked particles are dispersed in a solvent and then the silane coupling agent is added thereto and reacted.

Since there are cases where the hollow silica particles obtained by this step have been aggregated by the drying or baking step, the hollow silica particles hence may be disintegrated in order to become a handleable aggregation size. Examples of disintegration methods include a method in which a mortar is used, a method in which a dry or wet ball mill is used, a method in which a sieve shaker is used, and a method in which a disintegrator such as a pin mill, a cutter mill, a hammer mill, a knife mill, a roller mill, or a jet mill is used. Preferred aggregate sizes (specifically, median diameter and coarse-particle size) of the second particles are as described hereinabove.

Since the hollow silica particles of the present invention have densified shell layers, the hollow silica particles, when added to various organic solvents including methyl ethyl ketone and N-methylpyrrolidone, are less apt to suffer permeation of the solvents. The hollow silica particles hence have satisfactory dispersibility in various solvents and, in the solvents, can retain the properties characteristic of hollow particles.

The hollow silica particles of the present invention can be used as various fillers, especially suitable for use as a filler in resin compositions for use in producing electronic substrates to be used in, for example, electronic appliances such as personal computers, laptop computers, and digital cameras and communication appliances such as smartphones and video game devices.

EXAMPLES

Now, the present invention will be described in further detail with reference to Examples, but the present invention is not limited thereto. In the following description, as components in common, the same component is used. Furthermore, unless otherwise specified, "%" and "parts" mean "mass %" and "parts by mass", respectively.

Ex. 1 to Ex. 23 are Examples of the present invention, and Ex. 24 is a Comparative Example.

Test Example 1

(Ex. 1)
(Preparation of Emulsion)

7 g of an EO-PO-EO block copolymer (Pluronic F68, manufactured by ADEKA Corporation) was added to 1,250 g of pure water and stirred until being dissolved. To this aqueous solution was added 42 g of n-dodecane, followed by stirring with a homogenizer manufactured by IKA-Werke GmbH & Co. KG until the entire liquid became uniform to prepare a crude emulsion.

The crude emulsion was emulsified three times under a pressure of 400 bar using a high-pressure emulsifier (LAB2000, manufactured by SMT CO., LTD.) to prepare a fine emulsion having an emulsion size of 0.3 μm.

(Formation of First-Stage Shells)

To 1,300 g of the obtained fine emulsion were added 41 g of a diluted sodium silicate aqueous solution ($SiO_2$ concentration, 10.4 mass %; $Na_2O$ concentration, 3.6 mass %) and 2M hydrochloric acid so as to result in a pH of 2

(conditions shown in (i) of Table 1). The mixture was sufficiently stirred while being held at 30° C. (conditions shown in (ii) of Table 1).

1M sodium hydroxide aqueous solution was slowly added dropwise to the liquid with sufficient stirring so as to result in a pH of 6 (conditions shown in (iii) of Table 1), thereby obtaining a dispersion of oil core/silica shell particles. The obtained dispersion of oil core/silica shell particles was held for maturation.

(Formation of Second-Stage Shells)

The whole dispersion of oil core/silica shell particles obtained by the formation of first-stage shells was heated to 70° C., and 1M NaOH was slowly added thereto with stirring to adjust the pH to 9.

Next, 460 g of a diluted sodium silicate aqueous solution ($SiO_2$ concentration: 10.4 mass %, $Na_2O$ concentration: 3.6 mass %) was gradually added together with 0.5M hydrochloric acid so as to result in a pH of 9.

This suspension was held at 70° C. for 2 days and then slowly cooled to room temperature to obtain a hollow silica precursor dispersion.

(Filtration, Washing, Drying, Baking)

The whole dispersion of a hollow silica precursor was subjected to pressure filtration (pressure, 0.28 MPa) through a 0.45 μm hydrophilic PTFE (polytetrafluoroethylene) membrane filter. Thereafter, 350 mL of 40° C. distilled water was added to the solid matter, and the mixture was subjected again to the pressure filtration. The resultant hollow silica cake was washed.

The cake obtained through the filtration was dried in a nitrogen atmosphere at 60° C. for 1 hour and then at 400° C. for 4 hours (heating time: 5° C./min) to remove the organic matter, thereby obtaining a hollow silica precursor.

The obtained precursor was baked at 1,000° C. for 4 hours (heating time: 5° C./min) to bake and densify the shells. Thus, hollow silica baked particles were obtained.

(Surface Treatment)

10 g of the hollow silica baked particles, 120 mL of methyl ethyl ketone, and 0.8 g of hexamethyldisilazane were out into a 200 ml-glass beaker, followed by stirring at room temperature for 3 hours. Thereafter, the mixture was subjected to vacuum filtration with a hydrophobic PTFE membrane filter, washed with 20 mL of methyl ethyl ketone, and then vacuum dried for 2 hours with a vacuum dryer having a temperature regulated to 150° C. The obtained solid was pulverized with an agate mortar to obtain surface-treated hollow silica particles.

(Evaluation)

1. Infrared Spectrum Examination

An infrared spectrum was determined by examining a sample dispersed in a diamond powder, by a diffuse reflection method using IR Prestige-21 (manufactured by Shimadzu Corporation). The measurement range was 400-4, 000 $cm^{-1}$, the resolving power was 4 $cm^{-1}$, and the number of integrations was 128 times.

With respect to the dilution with the diamond powder, the degree of dilution by mass was defined as [degree of dilution by mass]=([sample mass])/([diamond mass]+[sample mass]), and the degree of dilution by mass was set at 85-2.5×[BET specific surface area].

The hollow silica particles used were ones which had been vacuum-dried at 180° C. for 1 hour.

In the obtained IR spectrum, the peak intensity derived from various kinds of SiOH at around a wavenumber of 1,060 $cm^{-1}$ were normalized, which was taken as 1, and the peak intensity at around a wavenumber of 3,746 $cm^{-1}$ was obtained. The results thereof are shown in Table 2.

2. Density Measurement with Dry Pycnometer

Density was measured with a dry pycnometer (AccuPycII 1340, manufactured by Micromeritics Instruments Corporation). The measurement conditions were as follows.

The results thereof are shown in Table 2.

Sample cell: 10 cm³ cell

Sample weight: 1.0 g

Measurement gas: helium or argon

Number of purging operations: 10 times

Packing pressure in purging treatment: 135 kPag

Number of cycles: 10 times

Packing pressure in cycling: 135 kPag

Rate of terminating pressure equilibrium: 0.05 kPag/min

3. Sphericity, Average Primary Particle Size

The hollow silica particles obtained in Ex. 1 were photographed with a scanning electron microscope. The scanning electron microscope image (SEM image) is shown in the FIGURE.

A hundred particles arbitrarily selected from the FIGURE were each examined for longest diameter (DL) and shorter diameter (DS) orthogonal thereto, and the ratio (DS/DL) of the shortest diameter (DS) to the longest diameter (DL) was calculated. The sphericity was determined from an average value of the ratios. Likewise, an average value of a distribution by collecting the primary particle sizes of arbitrarily selected 100 particles was taken as the average primary particle size. The results thereof are shown in Table 2.

4. Median Diameter

The obtained hollow silica particles were examined with a diffraction scattering type particle size distribution analyzer (MT3300) manufactured by MicrotracBEL Corporation. An average value of measured particle size distribution (diameter) twice was determined. As a result, the median diameter was found to be 2 μm.

5. Specific Surface Area, Pore Volume

The hollow silica particles were vacuum dried at 230° C. to completely remove the water to prepare a sample. This sample was examined for a multipoint BET method specific surface area and pore volume with automatic specific surface area/pore volume analyzer "TriStar II", manufactured by Micrometrics Instruments Corporation using argon gas. The results thereof are shown in Table 2.

6. Oil Absorption

Oil absorption was determined in accordance with JIS K 5101-13-1. The results thereof are shown in Table 2.

7. Concentration of Metal M (M=Li, Na, K, Rb, Cs, Mg, Ca, Sr, Ba)

Perchloric acid and hydrofluoric acid were added to the spherical hollow silica particles, and the resultant mixture was ignited to remove the main-component silicon, followed by measuring with ICPE-9000 (manufactured by Shimadzu Corporation) by ICP-AES (high-frequency inductively coupled plasma atomic emission spectroscopy). As a result of the examination, Na, K, Mg, and Ca were detected as the metal M. The total amount of the metals M is shown in Table 2.

8. Relative Permittivity, Dielectric Loss Tangent

Relative permittivity and dielectric loss tangent were determined by a perturbation resonator method using a device exclusively therefor ("Vector Network Analyzer E5063A, manufactured by KEYCOM Corporation) under the conditions of a test frequency of 1 GHz, a test temperature of about 24° C., and a humidity of about 45%, the number of measurements being 3 times.

Specifically, the hollow silica particles were vacuum-dried at 150° C., and the dried powder was packed into a PTFE tube with sufficient tapping. This sample, together with the container, was subjected to determination of relative permittivity. Thereafter, the data were converted to the relative permittivity and dielectric loss tangent of the powder using the logarithmic mixing rule. The results thereof are shown in Table 2.

(Ex. 2 to Ex. 4)

The same procedure as in Ex. 1 was conducted under the same conditions, except that the baking temperature was changed as shown in Table 1.

(Ex. 5 to Ex. 8 and Ex. 18 to Ex. 21)

The same procedure as in Ex. 1 was conducted under the same conditions, except that the amount of the sodium silicate aqueous solution in the formation of second-stage shells was changed as shown in Table 1 and that the conditions for washing the hollow silica cake were changed as shown in Table 1.

(Ex. 9 and Ex. 10)

The same procedure as in Ex. 1 was conducted under the same conditions, except that only the homogenizer manufactured by IKA Werke GmbH & Co. KG was used to produce an emulsion, which had the particle size shown in Table 1.

(Ex. 11)

The same procedure as in Ex. 1 was conducted under the same conditions, except that in the step of emulsion preparation, the using amount of the EO-PO-EO block copolymer (Pluronic F68, manufactured by ADEKA Corporation) was changed to 70 g, the n-dodecane was replaced by olive oil, and the high-pressure emulsification under a pressure of 400 bar was conducted five times, thereby obtaining an emulsion having the particle size shown in Table 1, and that the baking temperature was changed to 800° C.

(Ex. 12 to Ex. 15)

The same procedure as in Ex. 1 was conducted under the same conditions, except that the conditions for forming the first-stage shells were changed as shown in Table 1.

(Ex. 16)

The same procedure as in Ex. 1 was conducted under the same conditions, except that in the step of emulsion preparation, the using amount of the EO-PO-EO block copolymer (Pluronic F68, manufactured by ADEKA Corporation) was changed to 20 g, the n-dodecane was replaced by n-hexadecane, and the high-pressure emulsification under a pressure of 400 bar was conducted three times, thereby obtaining an emulsion having the particle size shown in Table 1, and that the conditions for forming the first-stage shells were changed as shown in Table 1.

(Ex. 17)

The same procedure as in Ex. 1 was conducted under the same conditions, except that the step of surface treatment was omitted.

(Ex. 22 and Ex. 23)

The same procedure as in Ex. 1 was conducted under the same conditions, except that in the step of emulsion preparation, the n-dodecane was replaced by decane, the high-pressure emulsification under a pressure of 400 bar was conducted three times, and the emulsion was allowed to stand at room temperature for 48 hours in Ex. 22 or at room temperature for 96 hours in Ex. 23, thereby obtaining a fine emulsion having the particle size shown in Table 1.

(Ex. 24)

The same procedure as in Ex. 1 was conducted under the same conditions, except that the baking temperature was changed as shown in Table 1.

Those results are summarized in Table 2.

With respect to Ex. 1, the SEM image of the hollow silica particles is shown in the FIGURE.

TABLE 1

| | Emulsion size μm | Conditions for first-stage shell formation reaction | | | Amount of sodium silicate aqueous solution in second-stage shell formation | Washing conditions | | | | Baking temperature ° C. |
| | | (i) pH | (ii) Temperature | (iii) pH | | Kind | Addition amount | Number of washing operations | | |
| --- | --- | --- | --- | --- | --- | --- | --- | --- | --- | --- |
| Ex. 1 | 0.3 | 2 | 30° C. | 6 | 340 | distilled water | 350 | 1 | | 1000 |
| Ex. 2 | 0.3 | 2 | 30° C. | 6 | 340 | distilled water | 350 | 1 | | 1250 |
| Ex. 3 | 0.3 | 2 | 30° C. | 6 | 340 | distilled water | 350 | 1 | | 800 |
| Ex. 4 | 0.3 | 2 | 30° C. | 6 | 340 | distilled water | 350 | 1 | | 1200 |
| Ex. 5 | 0.3 | 2 | 30° C. | 6 | 121 | distilled water | 130 | 1 | | 1000 |
| Ex. 6 | 0.3 | 2 | 30° C. | 6 | 1550 | distilled water | 500 | 3 | | 1000 |
| Ex. 7 | 0.3 | 2 | 30° C. | 6 | 90 | distilled water | 100 | 1 | | 1000 |
| Ex. 8 | 0.3 | 2 | 30° C. | 6 | 2500 | distilled water | 500 | 5 | | 1000 |
| Ex. 9 | 3 | 2 | 30° C. | 6 | 340 | distilled water | 350 | 1 | | 1000 |
| Ex. 10 | 6 | 2 | 30° C. | 6 | 340 | distilled water | 350 | 1 | | 1000 |
| Ex. 11 | 0.03 | 2 | 30° C. | 6 | 340 | distilled water | 350 | 1 | | 800 |
| Ex. 12 | 0.3 | 1.5 | 30° C. | 6 | 340 | distilled water | 350 | 1 | | 1000 |
| Ex. 13 | 0.3 | 1 | 30° C. | 6 | 340 | distilled water | 350 | 1 | | 1000 |
| Ex. 14 | 0.3 | 2 | 30° C. | 4 | 340 | distilled water | 350 | 1 | | 1000 |
| Ex. 15 | 0.3 | 2 | 30° C. | 3 | 340 | distilled water | 350 | 1 | | 1000 |
| Ex. 16 | 0.1 | 2 | 45° C. | 6 | 340 | distilled water | 350 | 1 | | 1000 |
| Ex. 17 | 0.3 | 2 | 30° C. | 6 | 340 | distilled water | 350 | 1 | | 1000 |
| Ex. 18 | 0.3 | 2 | 30° C. | 6 | 340 | 1M $MgCl_2$ aqueous solution | 350 | 1 | | 1000 |
| Ex. 19 | 0.3 | 2 | 30° C. | 6 | 340 | 1M $MgCl_2$ aqueous solution | 350 | 10 | | 1000 |
| Ex. 20 | 0.3 | 2 | 30° C. | 6 | 340 | distilled water | 350 | 10 | | 1000 |
| Ex. 21 | 0.3 | 2 | 30° C. | 6 | 340 | distilled water | 500 | 20 | | 1000 |
| Ex. 22 | 0.7 | 2 | 30° C. | 6 | 270 | distilled water | 350 | 1 | | 1000 |
| Ex. 23 | 1.2 | 2 | 30° C. | 6 | 270 | distilled water | 350 | 1 | | 1000 |
| Ex. 24 | 0.3 | 2 | 30° C. | 6 | 340 | distilled water | 350 | 1 | | 680 |

TABLE 2

| | Peak intensity around 3,746 $cm^{-1}$ | He density $g/cm^3$ | Ar density $g/cm^3$ | Average primary particle size μm | BET specific surface area $m^2/g$ | Sphericity | Oil absorption ml/100 g | Pore volume $cm^3/g$ | Silane treatment | Amount of metal M mass ppm | Relative permittivity at 1 GHz | Dielectric loss tangent at 1 GHz |
| --- | --- | --- | --- | --- | --- | --- | --- | --- | --- | --- | --- | --- |
| Ex. 1 | 0.06 | 2.20 | 1.00 | 0.4 | 40 | 0.98 | 200 | 0.05 | performed | 500 | 2.0 | 0.0008 |
| Ex. 2 | 0.06 | 2.20 | 1.40 | 0.4 | 2 | 0.98 | 40 | 0.01 | performed | 500 | 4.9 | 0.0008 |
| Ex. 3 | 0.32 | 2.00 | 1.00 | 0.4 | 200 | 0.98 | 850 | 0.07 | performed | 500 | 2.5 | 0.04 |
| Ex. 4 | 0.06 | 2.20 | 1.00 | 0.4 | 5 | 0.98 | 250 | 0.02 | performed | 500 | 4.5 | 0.0008 |
| Ex. 5 | 0.07 | 2.20 | 0.45 | 0.4 | 70 | 0.98 | 300 | 0.05 | performed | 500 | 1.4 | 0.0024 |
| Ex. 6 | 0.06 | 2.20 | 1.60 | 0.4 | 40 | 0.98 | 200 | 0.05 | performed | 500 | 3.5 | 0.0006 |
| Ex. 7 | 0.07 | 2.20 | 0.35 | 0.4 | 120 | 0.98 | 550 | 0.02 | performed | 500 | 1.3 | 0.003 |
| Ex. 8 | 0.06 | 2.20 | 2.00 | 0.4 | 20 | 0.98 | 120 | 0.05 | performed | 300 | 4.5 | 0.0006 |
| Ex. 9 | 0.06 | 2.20 | 1.00 | 4 | 3 | 0.98 | 25 | 0.05 | performed | 1200 | 2.0 | 0.0008 |
| Ex. 10 | 0.06 | 2.20 | 1.00 | 7 | 2 | 0.98 | 15 | 0.05 | performed | 1500 | 2.0 | 0.0008 |
| Ex. 11 | 0.12 | 2.20 | 1.00 | 0.04 | 300 | 0.98 | 1300 | 0.2 | performed | 200 | 2.0 | 0.0022 |
| Ex. 12 | 0.06 | 2.20 | 1.20 | 0.4 | 60 | 0.75 | 300 | 0.05 | performed | 500 | 2.4 | 0.0016 |
| Ex. 13 | 0.07 | 2.20 | 1.50 | 0.4 | 100 | 0.82 | 600 | 0.05 | performed | 500 | 3.0 | 0.002 |
| Ex. 14 | 0.07 | 2.20 | 1.00 | 0.4 | 40 | 0.98 | 200 | 0.05 | performed | 500 | 2.0 | 0.008 |
| Ex. 15 | 0.07 | 2.20 | 1.00 | 0.4 | 40 | 0.98 | 200 | 0.05 | performed | 500 | 2.0 | 0.008 |
| Ex. 16 | 0.10 | 2.20 | 1.00 | 0.1 | 80 | 0.98 | 400 | 0.15 | performed | 800 | 2.5 | 0.016 |
| Ex. 17 | 0.19 | 2.20 | 1.00 | 0.4 | 40 | 0.98 | 200 | 0.05 | omitted | 500 | 2.0 | 0.02 |
| Ex. 18 | 0.06 | 2.20 | 1.00 | 0.4 | 40 | 0.98 | 200 | 0.05 | performed | 40000 | 3.5 | 0.0008 |
| Ex. 19 | 0.06 | 2.20 | 1.00 | 0.4 | 40 | 0.98 | 200 | 0.05 | performed | 60000 | 4.0 | 0.0008 |
| Ex. 20 | 0.20 | 2.20 | 1.00 | 0.4 | 40 | 0.98 | 200 | 0.05 | performed | 60 | 2.0 | 0.022 |
| Ex. 21 | 0.17 | 2.20 | 1.00 | 0.4 | 40 | 0.98 | 200 | 0.05 | performed | 30 | 2.0 | 0.018 |
| Ex. 22 | 0.06 | 2.20 | 0.60 | 0.6 | 15 | 0.98 | 100 | 0.05 | performed | 500 | 2.0 | 0.0005 |
| Ex. 23 | 0.06 | 2.20 | 0.60 | 1.1 | 10 | 0.98 | 70 | 0.05 | performed | 500 | 2.0 | 0.0003 |
| Ex. 24 | 0.64 | 1.90 | 1.80 | 0.4 | 200 | 0.98 | 1000 | 1.1 | performed | 500 | 5.2 | 0.088 |

As shown in Table 2, it was seen that the hollow silica particles, in the density measurement with a dry pycnometer using helium gas as a measurement gas, had a density of 2.20 g/cm³, which is the equivalent value as the true density of silica, indicating that the helium gas had permeated through the shells and entered into the inner cavities of the hollow silica. Meanwhile, in the case of using argon gas, the hollow silica particles of each Example had a smaller value than that obtained in the measurement by the helium pycnometer method. This is thought to be because the rate at which the argon gas permeated through the shells was so low that the particle density of the hollow silica excluding the inner cavities was obtained.

Ex. 1 to Ex. 23 gave small values of relative permittivity at 1 GHz and dielectric loss tangent at 1 GHz, whereas Ex. 24 was high in both relative permittivity at 1 GHz and dielectric loss tangent at 1 GHz and was unable to produce the desired effects of the present invention.

In particular, as can be seen from a comparison between Ex. 1 to Ex. 4 and Ex. 24, in the case where the peak intensity at a wavenumber of around 3,746 cm$^{-1}$ in infrared spectroscopy was changed, the peak intensity exceeding 0.60 resulted in unsatisfactory values of both relative permittivity and dielectric loss tangent. This is thought to be because the baking temperature had been insufficient and this resulted in a large amount of remaining surface silanol groups and because the sintering of the silica had been insufficient and the shells had hence been not densified. It was also seen that a baking temperature exceeding 1,200° C. tended to increase the relative permittivity. This is thought to be because the crystallization of the amorphous silica had proceeded. It was further seen that the baking temperature corresponded to the density by the helium pycnometer so that the density by the helium pycnometer increased as the temperature rose to 1,000° C. and then came not to increase any more at 1,000° C. This is thought to be because the silanol groups contained in the silica had been dehydrated and this made the density close to the theoretical density of silica.

Test Example 2

The following test was conducted in order to examine the dispersibility of hollow silica particles in a resin. As the hollow silica particles were used Ex. 1 and Ex. 14 to Ex. 16 produced in Test Example 1.

A hundred parts of a toluene solution of a styrene-modified poly(phenylene ether) resin ("OPE-2St (number-average molecular weight: 1,200)", manufactured by Mitsubishi Gas Chemical Company, inc.; nonvolatile content: 64.4 wt %) and 100 parts of the hollow silica particles were mixed with 15 parts of methyl ethyl ketone (MEK). This mixture was kneaded with planetary centrifugal mixer "Awatori Rentaro (trade name; type ARE-250; manufactured by THINKY Corporation) at 2,000 rpm for 5 minutes to produce a resin varnish.

The obtained resin varnish was examined in accordance with the fineness gauge method described in JIS K5400 to determine a median diameter and a fineness gauge. Meanwhile, the median diameter of secondary particles of the hollow silica particles and the coarse-particle size (D90) of the secondary particles were determined with a diffraction scattering type particle size distribution analyzer (MT3300) manufactured by MicrotracBEL Corporation. A median of the particle size distribution (diameter) was determined twice and an average value thereof was taken as the median diameter of the secondary particles. An average value of the particle size in the particle size distribution (diameter) which corresponded to a cumulation of 90% was taken as the coarse-particle size (D90) of the secondary particles. The results thereof are shown in Table 3.

TABLE 3

|  | Median diameter of secondary particles μm | Coarse-particle size of secondary particles (D90) μm | Fineness gauge μm |
|---|---|---|---|
| Ex 1 | 2 | 10 | 25 |
| Ex. 14 | 30 | 60 | 120 |
| Ex. 15 | 60 | 100 | 300 |
| Ex. 16 | 0.22 | 3 | 500 |

It was seen from the results in Table 3 that Ex. 16, in which the median diameter of secondary particles was 0.22 μm, tended to suffer secondary aggregation and gave an increased value of fineness gauge. It was also seen that Ex.

15, in which the median diameter of secondary particles was 60 had an increased proportion of large particles and likewise tended to give an increased value of fineness gauge.

Furthermore, it was seen that as the coarse-particle size (D90) of secondary particles increased, the proportion of large particles tended to become high to increase the value of fineness gauge.

Test Example 3

The following test was conducted in order to confirm the denseness of the shells of hollow silica particles. As the hollow silica particles were used Ex. 1, Ex. 12, and Ex. 13 produced in Test Example 1.

Using a 10 mL Gay-Lussac specific-gravity bottle, density measurements were made in methyl ethyl ketone (MEK). Into the specific-gravity bottle were introduced 0.20 g of the hollow silica particles. The specific-gravity bottle was filled with MEK and allowed to stand at 25° C. for 48 hours, and the density was then measured. The results thereof are shown in Table 4.

TABLE 4

|  | He density g/cm$^3$ | Ar density g/cm$^3$ | MEK density g/cm$^3$ |
|---|---|---|---|
| Ex. 1 | 2.20 | 1.00 | 0.80 |
| Ex. 12 | 2.20 | 1.20 | 1.00 |
| Ex. 13 | 2.20 | 1.50 | 1.40 |

It was confirmed from Table 4 that as the density by the argon pycnometer method decreased, the density in MEK decreased. It was seen from this that the hollow silica particles obtained in each of these Examples had dense shells and were able to retain the hollow structure even in the organic solvent.

Test Example 4

The following test was conducted in order to examine obtained hollow silica particles for hygroscopicity. As the hollow silica particles were used Ex. 1, Ex. 3, Ex. 17, and Ex. 24 produced in Test Example 1.

The hollow silica particles were dried at 200° C., subsequently allowed to stand for 24 hours in an environment having 40° C. and a RH of 90%, and then examined by Karl Fischer method (coulometric titration method). The results thereof are shown in Table 5. [Conditions for Karl Fischer method (coulometric titration method)]

Moisture meter (Model CA-200, manufactured by Mitsubishi Chemical Analytech Co., Ltd.)

Moisture vaporizer (VA-200, manufactured by Mitsubishi Chemical Analytech Co., Ltd.)

Anolyte (HYDRANAL Coulomat AG-OVEN, manufactured by Hayashi Pure Chemical Ind., Ltd.)

Catholyte (HYDRANAL Coulomat CG, manufactured by Hayashi Pure Chemical Ind., Ltd.)

Heating temperature: 200° C.

Nitrogen flow rate: about 250 mL/min

TABLE 5

| | Baking temperature ° C. | Silane treatment | Moisture adsorption % |
|---|---|---|---|
| Ex. 1 | 1000 | performed | 0.4 |
| Ex. 3 | 800 | performed | 2 |
| Ex. 17 | 1000 | omitted | 0.6 |
| Ex. 24 | 680 | performed | 6 |

It was seen from Table 5 that the higher the baking temperature, the lower the hydrophilicity of the surface of the hollow silica particles and hence the smaller the moisture adsorption. It was also seen that performing the silane treatment had reduced the hydrophilicity of the surface and hence resulted in a decrease in moisture adsorption. Furthermore, it was seen that the smaller the moisture adsorption, the more the hollow silica particles are effective in giving a resin composition which less absorbs moisture and which has a reduced dielectric loss.

While the invention has been described in detail and with reference to specific embodiments thereof, it will be apparent to one skilled in the art that various changes and modifications can be made therein without departing from the spirit and scope thereof. This application is based on a Japanese patent application filed on Feb. 27, 2020 (Application No. 2020-032046), a Japanese patent application filed on Sep. 25, 2020 (Application No. 2020-161378), and a Japanese patent application filed on Sep. 25, 2020 (Application No. 2020-161379), the contents thereof being incorporated herein by reference.

The invention claimed is:

1. Hollow silica particles, which each comprise a shell layer containing silica and a space inside the shell layer, wherein the hollow silica particles contain at least one metal M selected from the group consisting of Li, Na, K, Rb, Cs, Mg, Ca, Sr, and Ba, wherein a concentration of the metal M contained in the hollow silica particles is 50 mass ppm or more and 5 mass % or less, and wherein the hollow silica particles have a peak intensity derived from SiOH at a wavenumber of around 3,746

$cm^{-1}$ of 0.60 or less by infrared spectroscopy, a relative permittivity at 1 GHz of from 1.3 to 5.0 and a dielectric loss tangent at 1 GHz of from 0.0001 to 0.05.

2. The hollow silica particles according to claim 1, which have a particle density as measured by a dry pycnometer density measurement using helium gas of from 2.00 $g/cm^3$ to 2.30 $g/cm^3$.

3. The hollow silica particles according to claim 1, which have a particle density as measured by a dry pycnometer density measurement using argon gas of from 0.35 $g/cm^3$ to 2.00 $g/cm^3$.

4. The hollow silica particles according to claim 1, which have an average primary particle size of from 50 nm to 10 μm.

5. The hollow silica particles according to claim 1, which have a BET specific surface area of from 1 $m^2/g$ to 300 $m^2/g$.

6. The hollow silica particles according to claim 1, which have a sphericity of from 0.75 to 1.0.

7. The hollow silica particles according to claim 1, which have an oil absorption of from 15 mL/100 g to 1,300 mL/100 g.

8. The hollow silica particles according to claim 1, which have a median diameter of secondary particles of from 0.20 μm to 60 μm.

9. The hollow silica particles according to claim 1, which have a coarse particle size (D90) of secondary particles of from 1 μm to 100 μm.

10. The hollow silica particles according to claim 1, which have a pore volume of 0.2 $cm^3/g$ or less.

11. The hollow silica particles according to claim 1, wherein a surface of the hollow silica particle is treated with a silane coupling agent.

12. A method for producing hollow silica particles according to claim 1, the method comprising:

forming a shell layer containing silica on the periphery of each of cores to obtain a hollow silica precursor;

removing the cores from the hollow silica precursor;

heat-treating the resultant particles at a temperature of 800° C. or higher; and treating surfaces of the heat-treated particles with a silane coupling agent.

* * * * *